United States Patent [19]
Riad

[11] Patent Number: 5,845,896
[45] Date of Patent: *Dec. 8, 1998

[54] COUNTER BALANCED SUSPENSION

[76] Inventor: Fawzy Riad, 1316 Milverton Dr., Troy, Mich. 48083

[*] Notice: This patent issued on a continued prosecution application filed under 37 CFR 1.53(d), and is subject to the twenty year patent term provisions of 35 U.S.C. 154(a)(2).

[21] Appl. No.: 664,626

[22] Filed: Jun. 17, 1996

Related U.S. Application Data

[63] Continuation-in-part of Ser. No. 525,185, Sep. 8, 1995, abandoned.

[51] Int. Cl.$^6$ .................... B60G 11/26; B60G 31/073
[52] U.S. Cl. .................... 267/221; 267/186; 267/33; 267/136; 267/256; 280/709; 280/710; 280/6.12; 280/112.2; 280/689; 188/378
[58] Field of Search .................... 267/136, 289, 267/259, 33, 34, 35, 168, 4, 231–256, 221, 230, 166, 228, 257, 31, DIG. 1, 64.16, 64.17, 186, 187, 286; 188/378–380; 280/701, 696, 96.1, 660, 661, 663, 702, 704, 709, 710, 705, 689, 698, 693, 678, 112.1, 112.2, 6.11, 772, 6.12, DIG. 1

[56] References Cited

U.S. PATENT DOCUMENTS

| | | | |
|---|---|---|---|
| 2,026,057 | 12/1935 | Pearse et al. | 267/250 |
| 2,593,040 | 4/1952 | Lloyd | 267/187 |
| 2,782,049 | 2/1957 | Peras | 280/710 |
| 2,792,235 | 5/1957 | Federspiel | 267/235 |
| 2,885,202 | 5/1959 | Trumper | 267/256 |
| 2,886,312 | 5/1959 | Freiermuth | 267/253 |
| 3,089,710 | 5/1963 | Fiala | 280/112.2 |
| 3,277,840 | 10/1966 | Li | 280/709 |
| 3,368,824 | 2/1968 | Julien | 280/701 |
| 3,451,692 | 6/1969 | Kappe | 267/31 |
| 3,473,822 | 10/1969 | Fitch | 267/253 |
| 3,559,976 | 2/1971 | Jerz, Jr. | 267/168 |
| 3,563,566 | 2/1971 | Weber | 267/186 |
| 3,638,963 | 2/1972 | VanLeeuwen | 267/253 |
| 3,861,696 | 1/1975 | Gustafsson | 280/709 |
| 3,869,141 | 3/1975 | Ito et al. | 280/709 |
| 3,885,809 | 5/1975 | Pitcher | 280/112.2 |
| 3,901,494 | 8/1975 | Sena | 267/289 |
| 4,145,073 | 3/1979 | McLuckie et al. | 280/702 |
| 4,186,914 | 2/1980 | Radwill et al. | 267/4 |
| 4,333,403 | 6/1982 | Tack et al. | 267/4 |
| 4,765,251 | 8/1988 | Guins | 267/4 |
| 4,886,255 | 12/1989 | Paton | 267/33 |
| 4,887,699 | 12/1989 | Ivers et al. | 267/136 |
| 4,976,454 | 12/1990 | Bohn | 280/710 |
| 4,979,595 | 12/1990 | Paton | 188/129 |
| 5,020,781 | 6/1991 | Huang | 267/136 |
| 5,116,069 | 5/1992 | Miller | 280/112.2 |
| 5,215,327 | 6/1993 | Gatter et al. | 280/701 |
| 5,265,704 | 11/1993 | Landesfeind | 267/136 |
| 5,337,864 | 8/1994 | Sjostrom | 188/299 |
| 5,401,053 | 3/1995 | Sahm et al. | 267/33 |
| 5,443,283 | 8/1995 | Hawkins et al. | 280/709 |
| 5,556,115 | 9/1996 | Heyring | 280/709 X |
| 5,566,970 | 10/1996 | Lin | 280/689 |

Primary Examiner—Douglas C. Butler

[57] ABSTRACT

A vehicle suspension system (110) having a primary suspension system (112) and a secondary suspension system (114). Vertical motion of a vehicle wheel (120) places a force on the vehicle frame (126) which, in turn, places a force on the vehicle body (124). The secondary suspension system (114) translates the relative motion between the wheel (120) and frame (126) into a force on the vehicle body (124) which is equal and opposite to the force transmitted from the frame (126) to the body (124). A frictional shock absorber (300) is utilized in the suspension system (110) as well as a multi-stage coil spring (400).

4 Claims, 6 Drawing Sheets

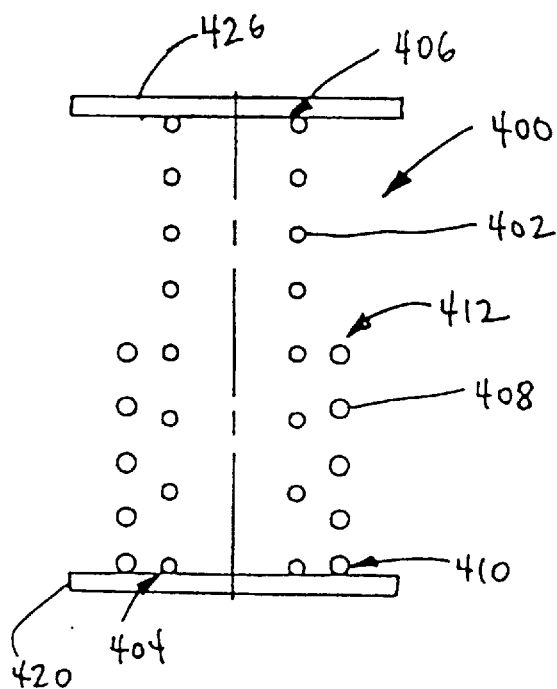
FIG. 4
FIG 7  PRIOR ART
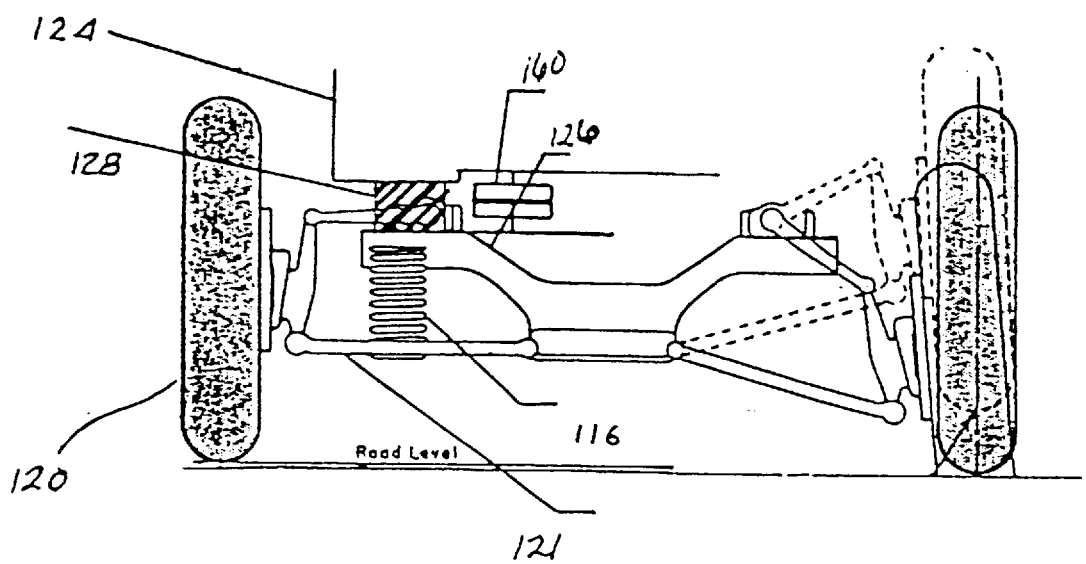

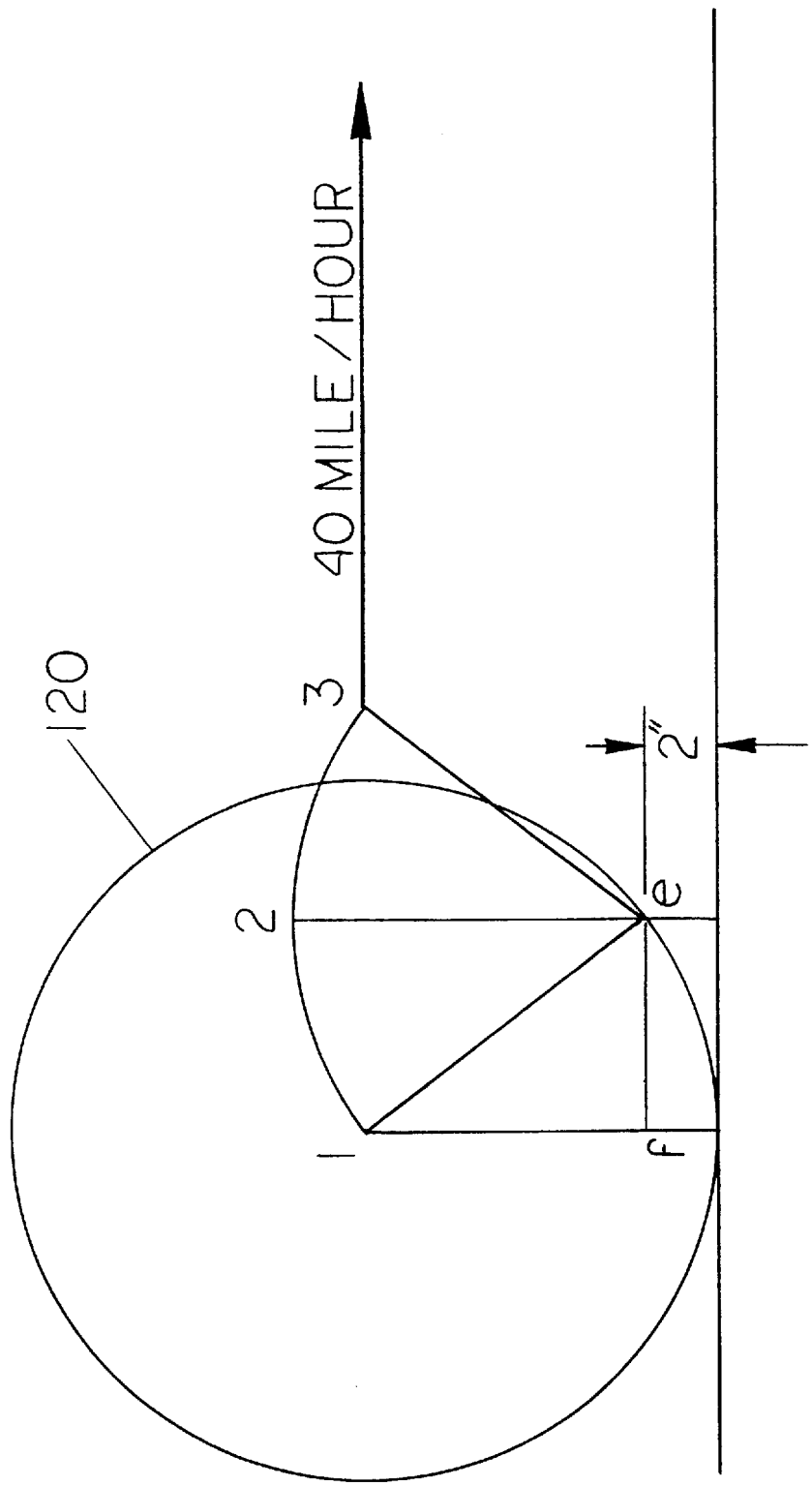

COUNTER BALANCED SUSPENSION

This application is a continuation-in-part of application Ser. No. 08/525,185 filed Sep. 8, 1995, now abandoned.

BACKGROUND OF THE INVENTION

1. Technical Field

This invention relates to a counter-balanced suspension system for use with vehicle suspensions. More specifically, it relates to a counter-balanced suspension system which isolates the road vibration from the vehicle frame to the vehicle body by applying a force to the vehicle body which is equal and opposite to the force applied to the body from the frame due to disturbances in the vehicle path.

2. Background Art

In conventional vehicle suspension systems, it is well known to use a spring in conjunction with a fluid damper to lessen the transmission of wheel vibrations to the body. It is also well known to incorporate a counterbalancing system into the suspension to absorb most of the wheel assembly vibration. However, prior counterbalanced designs have treated the body and the frame or engine cradle as one inelastic unit, and have counterbalanced the force of the wheel on this unit as a whole. In other words, prior designs have not attempted to counterbalance the forces acting between the body and frame of the vehicle. As such, prior counterbalanced designs have been only partially successful in reducing or eliminating unwanted vibrations from reaching passengers within a vehicle.

Active and semiactive systems have also been used to minimize vibrations transmitted from the wheel assembly to the vehicle body. Unfortunately, these systems are complicated, costly, and have an inherent lag time between sensing the vibrations and signaling a corresponding vibration-dampening response which prevents ideal dampening and compensation for the vibrations within the vehicle.

U.S. Pat. No. 2,886,312 to Freiermuth discloses a counterbalanced suspension system including multiple springs of varying compression rates located within a vehicle frame. Vertical motion of the wheel assembly is transferred via a mechanical coupling from a primary suspension system to a secondary suspension system. This system, however, treats the vehicle body and frame as a single inelastic unit and does not prevent vibrations on the frame from being transferred to the body.

U.S. Pat. No. 5,337,864 to Sjöistrom discloses a hydraulic-type resonance damper including a cylinder having a first piston connected to the vehicle body and a second piston connected to the vehicle wheel. The pistons divide the cylinder into upper, lower, and middle chambers, with the upper and lower chambers being in fluid communication via an actuator valve. The damper may be controlled passively, semi-actively or actively. Similar to the Freiermuth patent, this system also treats the vehicle body and frame as a single inelastic unit and does not isolate the body from vibrations on the frame.

U.S. Pat. No. 3,368,824 to Julien discloses a suspension system including a spring and a shock absorber disposed between a vehicle wheel assembly and a vehicle frame. The shock absorber includes a "heavy mass" to dampen relatively high frequency oscillations of the wheel while the spring dampens high amplitude, low frequency oscillations. The system does not disclose a device for counterbalancing vibrations transmitted from the vehicle frame to the vehicle body.

SUMMARY OF THE INVENTION AND ADVANTAGES

According to the present invention, there is provided a counter-balanced suspension for reducing the vibrations felt by a passenger within a vehicle during operation. The system comprises a vehicle frame, a vehicle body, a first resilient member disposed between the vehicle frame and the vehicle body, and a wheel assembly. A primary suspension system has a first end supported by the vehicle frame and a second end supported by the wheel assembly, and a secondary suspension system has a counterbalancing member supported by a first end of the secondary suspension system. The counterbalancing member has a counterweight member and a secondary resilient member. A force-transmitting coupling is operatively engaged with the vehicle frame, the vehicle body, and the counterbalancing member. The force-transmitting coupling allows the secondary suspension system to absorb vibration and shock which would otherwise pass through the vehicle frame to the vehicle body and be felt by the passengers within the vehicle.

The present invention further provides a frictional shock absorber for a vehicle which comprises a housing having an interior wall surface, a first end and a second end. The absorber also has a piston including a rod extending through the second end and a head mounted on the rod. The head of the piston includes a frictional member which frictionally engages the interior wall surface of the housing on at least two opposing points on the wall surface. A spring is joined to the frictional member forcing the frictional member into engagement with the interior wall surface of the housing. The frictional member is disposed at an angle with respect to the interior wall surface of the housing whereby the friction will differ between upward and downward movement of the piston.

One advantage of the present invention is that the vibration of the vertical motion of the wheel assembly and vehicle frame is isolated from the vehicle body and absorbed within the suspension by an equal and opposite reaction in the counterbalanced suspension system.

Another advantage of the present invention is an improved frictional damper for use in the counterbalanced suspension system. The improved frictional damper is a simple, efficient design with very few components relative to prior frictional dampers.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a sectional view of a two-staged coiled spring system;

FIG. 6 is a schematic of a 24 inch diameter vehicle wheel encountering a 2 inch rock at a speed of 40 mph; and FIG. 7 shows a standard vehicle suspension on which the present invention can be utilized.

DETAILED DESCRIPTION OF THE PREFERRED EMBODIMENT

Figure 1:
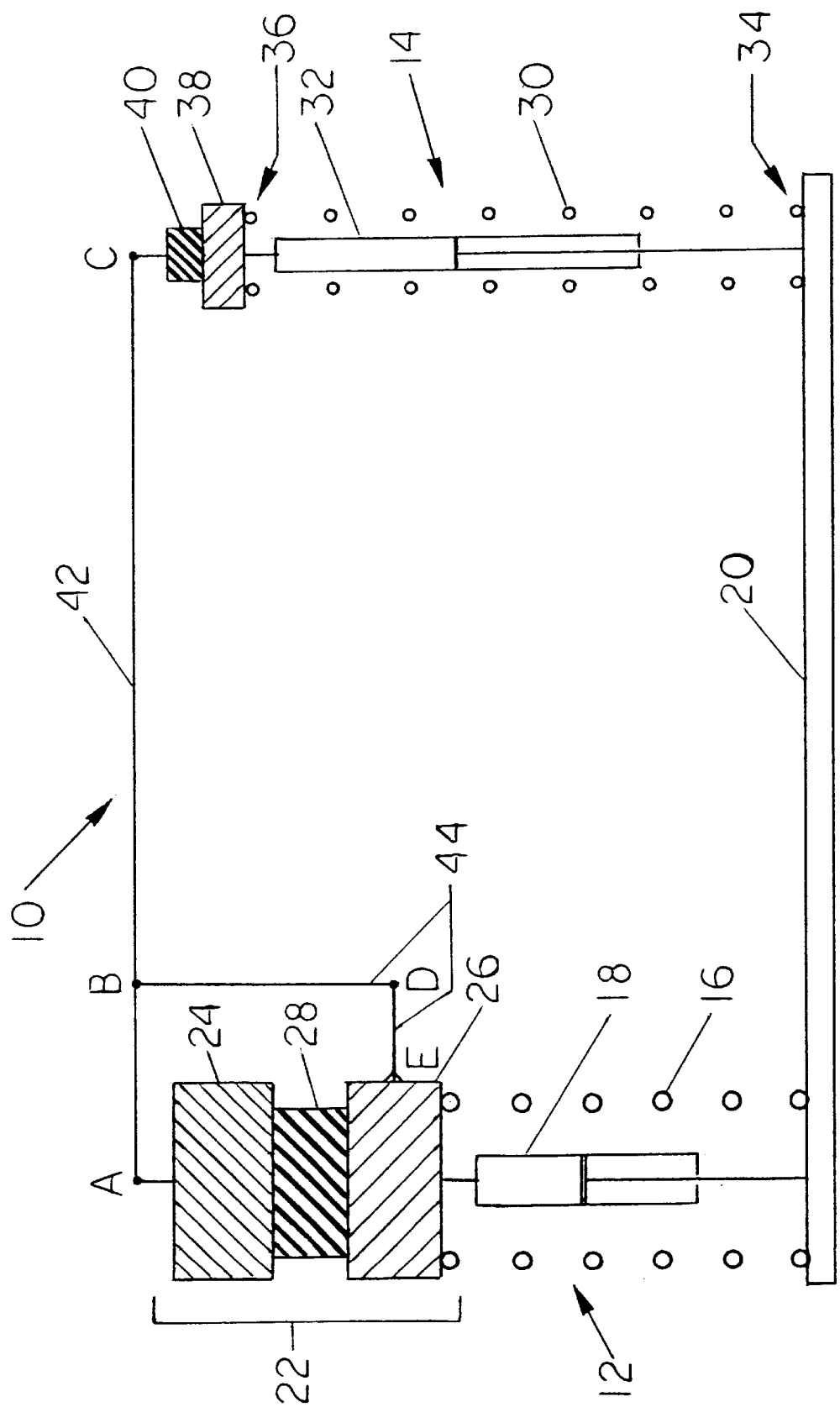
FIG. 1 is a schematic of the present invention with a mechanical coupling between the primary suspension and the secondary suspension.

A schematic of the vehicle suspension system of the present invention in its most simplified form is shown at 10 in FIG. 1. The suspension system 10 has a primary suspension system 12 and a secondary suspension system 14. The primary suspension system 12 comprises a primary spring 16 and a primary shock absorber 18 disposed between a wheel assembly 20 and a vehicle 22. The vehicle 22 consists of a body 24, a frame 26, and a primary resilient member 28 attached therebetween. A mechanical linkage 42 is pivotally attached to the body at a pivot point A.

The secondary suspension system 14 comprises a secondary spring 30 and a secondary shock absorber 32 each having a first end 34 and a second end 36. The first ends 34, 36 of the secondary spring 30 and secondary shock absorber 32 are operatively attached to the wheel assembly 20. The second ends 34,36 of the secondary spring 30 and secondary shock absorber 32 are operatively attached to a counterweight member 38. A secondary resilient member 40 is operatively attached to the counterweight member 38 and is attached to a pivot point C of the mechanical linkage 42 such that the resilient member 40 can be compressed or expanded in the vertical direction during wheel assembly vibration. A mechanical linkage 44 is fixed to the frame 26 at a point E and is pivotally attached to a point B of the mechanical linkage 42. The linkage 44 has a pivot point D which lies between point B and E.

As the wheel assembly 20 travels upward due to unevenness in the road, the primary spring 16 and primary shock absorber 18 are compressed. The travel of the wheel assembly likewise compresses the secondary spring 30 and secondary shock absorber 32. The compressive force created moves frame 26 upward, which in turn moves mechanical linkage 44 upward and compresses primary resilient member 28. As a result, mechanical linkage 42 pivots upward about the stationary point A. This transfer of motion from the primary suspension system 12 to the secondary suspension system 14 counterbalances the forces that would otherwise have been transferred to the body 24 via the primary resilient member 28.

The following equations illustrate the proportional relationship between the primary suspension system 12 and the counterbalanced suspension system 14 and the resulting forces. FIG. 6 illustrates a schematic of a vehicle wheel operating under the conditions presented in the following equations. Values assumed for the variables in the calculations are shown in Table I.

TABLE I

| | |
|---|---|
| Weight of the frame 26 per wheel 20 | 600 lb. |
| Weight of the body 24 per wheel 20 | 300 lb. |
| Rate of primary spring 16 | 300 lb./in. |
| Rate of primary resilient member 28 | 2000 lb./in. |
| Resistance of primary shock absorber 18 | 80 lb. tension 27 lb. compression |
| Diameter of wheel 20 | 24 in. |
| Speed of Car | 40 m.p.h. |
| Ratio of distance between points B to C and A to B in FIG. 1 | 10:1 |

The 10:1 ratio of the distance between B to C and A to B dictates a 10:1 ratio of the operative characteristics between the primary and secondary members of the suspension system 10, as follows:

The rate of the secondary spring 30 is 30 lb./in., which is $\frac{1}{10}$ the rate of primary spring 16.

The rate of secondary resilient rubber member 40 is 200 lb./in., which is $\frac{1}{10}$ the rate of the primary resilient member 28.

The resistance of the secondary shock absorber 32 is 8 lb. tension and 2.7 lb. compression, which is $\frac{1}{10}$ the resistance of primary shock absorber 18.

As the wheel assembly moves up a distance x, the primary suspension system 12 will react causing point D to move up a distance y. As a result, point B moves up a distance y, A does not move, and C moves up 11y. The primary resilient member 28 is also compressed a distance y. If the rate of the primary resilient member 28 is 2000 lb./in., then it will push the body upwardly with a force of 2000(y) lb.

For the counterweight member 38 to compress secondary resilient member 40 a distance y, the counterweight member 38 must move upward a distance 12y since the resilient member 40 is already moving upward a distance 11y. As such, the counterweight member 38 will have 12 times the acceleration of the frame 26.

The mass of the counterweight must be sufficient to create an equal and opposite force on the vehicle body 24 as is being placed thereon by the vehicle frame 26 through the primary resilient member 28. The mass of the counterweight member sufficient for this purpose is determined by the mass of the vehicle frame, the ratio of acceleration of the counterweight versus the vehicle frame, and the ratio of the distances from points A to B and B to C.

The counterweight 38 has one tenth the force on the frame 26 and should have twelve times its acceleration.

Thus, the counterweight mass equals:

$$(600)/(10)*(12)=5 \text{ lb.}$$

The upward force of the primary resilient member 28 on the vehicle body 24 is equal to:

$$y(\text{rate of member } 28)=2000y \text{ lb.}$$

The downward force on the vehicle body 24 at point A is equal to:

$$(\text{ratio of A to B and B to C})*y*(\text{rate of member } 40)=(10)(y)(200 \text{ lb./in.})=2000y \text{ lb.}$$

Thus, the upward force on the body 24 is counterbalanced by an equal downward force created by the secondary suspension system 14.

A closer study of the system reveals that link DB of the mechanical linkage 44 is pulling the chassis upward with a force=11*y*200=2200y lb. This force will increase the acceleration of the frame 26 adding to the compression of primary resilient member 28. However, because the period of time is very short, in the range of 0.01 seconds, the effect of the force from link DB on the body 24 is very small compared to the 2000y lb. force at point A on the mechanical linkage 42. This small force can be compensated for by increasing the rate of the secondary spring 30.

This configuration is only useful if the distance y is relatively small compared to the distance x travelled by the wheel assembly, because a large distance y will require the secondary spring 30 to expand an amount 12y. Further, this configuration of the counterbalanced suspension does not account for the inertial effects on the components of the counterbalanced suspension system 14. As a result, the counterbalanced suspension system 14 will not absorb an equal and opposite force to the frame 26 but will instead absorb a force much less. To remedy this effect, the mechanical linkages 42,44 are replaced with the hydraulic system shown in FIG. 2.

Figure 2:
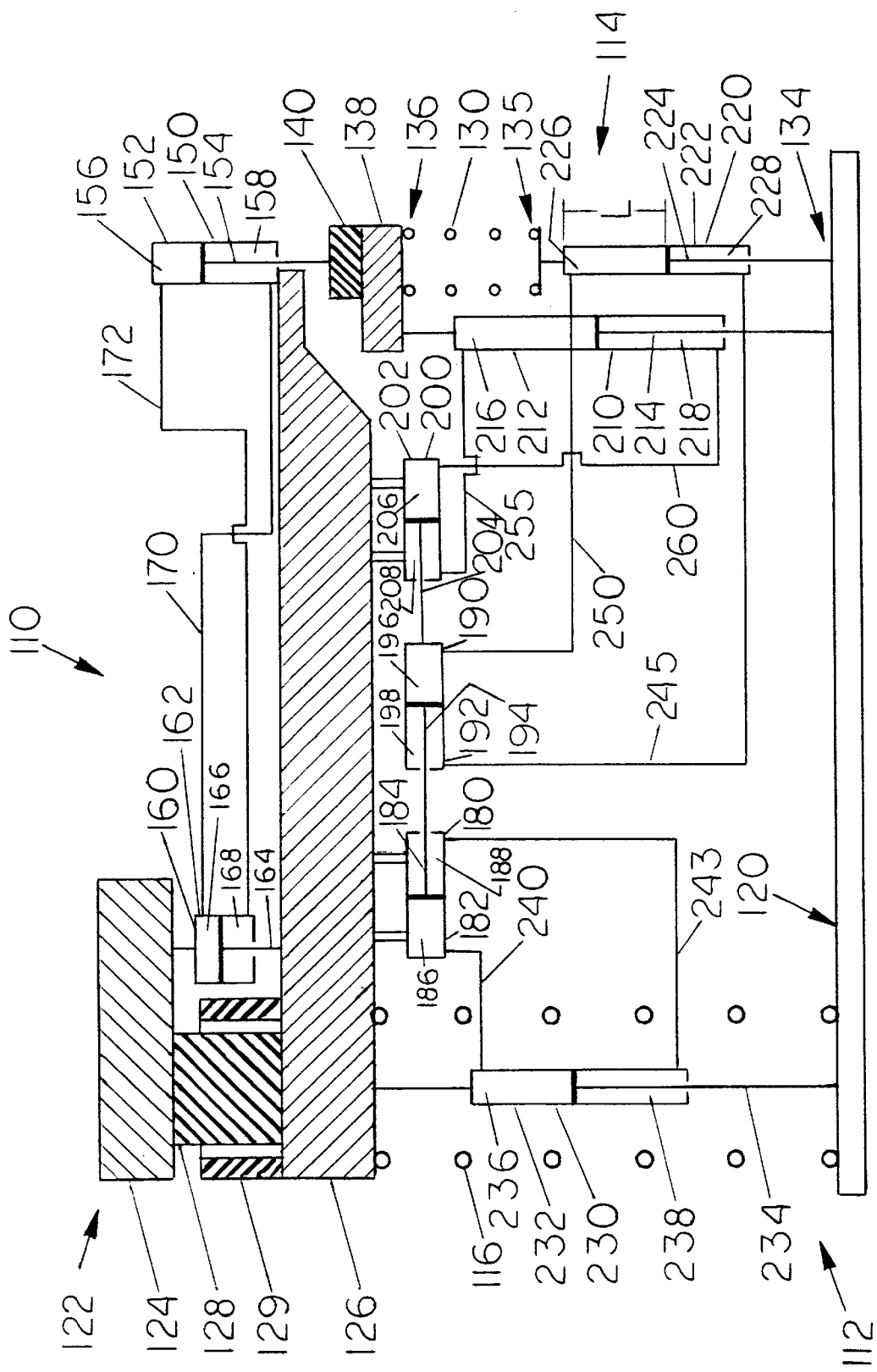
FIG. 2 is a schematic of the preferred embodiment of the present invention with a hydraulic coupling between the primary suspension and the secondary suspension.

A hydraulic counterbalanced suspension system is generally shown at 110 in FIG. 2. The hydraulic counterbalanced suspension system 110 has a primary suspension system 112 and a secondary suspension system 114. The primary suspension system 112 comprises a primary spring 116, a primary shock absorber (not shown), and a primary cylinder 230 disposed between a wheel assembly 120 and a vehicle 122. The vehicle 122 includes a body 124, a frame 126 and a primary resilient member 128 attached therebetween. Stops 129 are fixedly attached to or integrally formed as part of the frame 126. The vehicle 122 comprises the sprung mass whereas the primary spring 116, the primary shock absorber (not shown), the primary cylinder 230, and the wheel assembly 120 comprise the unsprung mass.

The secondary suspension system 114 comprises a secondary spring 130, a secondary shock absorber (not shown), and a secondary cylinder 220. A first end 134 of each of the secondary cylinder 220 and secondary shock absorber (not shown) is pivotally attached to the wheel assembly 120. A first end 135 of the secondary spring 130 is attached to the secondary cylinder 220. Second ends 136 of the secondary spring 130, secondary shock absorber (not shown), and secondary cylinder 220 are fixedly attached to a counterweight member 138. A secondary resilient member 140 is also attached to the counterweight member 138.

Hydraulic cylinders 150,160 are operatively disposed between the body 124 and frame 126 and are joined to the secondary suspension system 114. The hydraulic cylinders 150,160 have a housing 152,162, a piston 154,164, a first chamber 156,166, and a second chamber 158,168. The housing 152 of cylinder 150 is attached to frame 126 while the piston 154 is attached to second resilient member 140 such that the resilient member 140 can be compressed or expanded in the vertical direction during wheel assembly vibration. The piston 164 of cylinder 160 is joined to the frame 126 while the housing 162 is supported by the body 124. The first chamber 156 is in fluid communication with second chamber 168 by fluid passage 172; the second chamber 158 is in fluid communication with first chamber 166 by fluid passage 170.

The inertial effects on the components of the counterbalanced system mentioned above are negated by a hydraulic compensator shown at 176. The hydraulic compensator 176 includes cylinders 180,190,200 of equal cross-sectional area. The cylinder 180 is in a fixed position relative to cylinder 200. The cylinder 190 is positioned between cylinders 180 and 200 in such a manner that it is free to float between the cylinders. Cylinders 180,190,200 respectively include a housing 182,192,202, a piston 184,194,204, a first chamber 186,196,206, and a second chamber 188,198,208.

The hydraulic compensator 176 works in conjunction with a compensating cylinder 210 and the secondary cylinder 220. The compensating cylinder 210 and the secondary cylinder 220 respectively include a housing 212,222, a piston 214,224, a first chamber 216,226 and a second chamber 218,228. The primary cylinder 230 also has a housing 232, a piston 234, a first chamber 236 and a second chamber 238. The secondary cylinder 220 has a smaller cross sectional area than that of cylinders 230,180,190,200, 210 which all have the same cross-sectional area.

The first chamber 236 of the primary cylinder 230 is in fluid communication with first chamber 182 of cylinder 180 via fluid passage 240, and the second chamber 238 is in fluid communication with second chamber 188 by fluid passage 243. The first chamber 192 of cylinder 190 is in fluid communication with first chamber 226 of cylinder 200 via fluid passage 250, and the second chamber 198 is in fluid communication with second chamber 228 via fluid passage 245. The first chamber 206 of cylinder 200 is in fluid communication with second chamber 218 of compensating cylinder 210 via passage 260, and the second chamber 208 is in fluid communication with first chamber 216 via passage 255.

As the vehicle travels over an uneven road surface, the wheel assembly 120 will move vertically. When the wheel assembly 120 moves in an upward direction, the primary spring 116, secondary spring 130, primary resilient member 128, secondary resilient member 140, primary cylinder 230, secondary cylinder 220, compensating cylinder 210, and the shock absorbers (not shown) will be compressed. The fluid from first chamber 236 will flow into first chamber 182 which will move piston 184 to the right, forcing fluid from second chamber 188 into second chamber 238.

The fluid from first chamber 216 will flow into second chamber 208 which will move piston 204 to the right, forcing fluid from first chamber 202 into second chamber 218. As the piston 204, which is attached to the housing 192, moves right, and the piston 184, which is attached to the piston 194, moves right, the entire cylinder 190 will shift to the right. The problem of inertia discussed earlier is overcome by the transfer of fluid from the secondary cylinder 220 to the cylinder 190. The fluid from first chamber 226 will flow into first chamber 192 which will move piston 194 to the left, forcing fluid from second chamber 198 into second chamber 228.

The following equations illustrate the operation of this embodiment of the invention.

TABLE II

| Variable | Description | Value |
|---|---|---|
| r | ratio, primary suspension: secondary suspension | 10:1 |
| x | vertical distance travelled by wheel assembly | 2 in |
| y | vertical distance travelled by frame | |
| x" | acceleration of wheel assembly | |
| y" | acceleration of frame | |
| R' | rate of primary resilient member | 2000 lb/in |
| R" | rate of secondary resilient member | 200 lb/in |
| S' | rate of primary spring | 300 lb/in |
| S" | rate of secondary spring | 30 lb/in |
| W | weight of frame per wheel | 600 lb |
| v | horizontal velocity of vehicle | 40 mph |
| m | weight of mass | 5 lb |

$$\frac{\text{Area}_{Piston214}}{\text{Area}_{Piston224}} = r \quad (1)$$

$$\frac{\text{Area}_{Piston154}}{\text{Area}_{Piston164}} = 1/10 \quad (2)$$

$$\frac{\text{Area}_{Piston194}}{\text{Area}_{Piston224}} = r \quad (3)$$

$$\text{Area}_{Piston234} = \text{Area}_{Piston184} = \text{Area}_{Piston194} = \text{Area}_{Piston204} = \text{Area}_{Pi} \quad (4)$$

If wheel 120 moves a vertical distance x and the frame 126 moves a vertical distance y in a certain period of time, the piston 234 of primary cylinder 230 will move up (x−y) relative to the housing 232. The vehicle body 124 will not move, the piston 194 and housing 192 of cylinder 190 will each move to the right (x−y), counterweight member 138 will move up (12y) because its acceleration is 12 times the acceleration of the frame 126, and the piston 214 of cylinder 210 will move up (x−12y). The piston 204 of cylinder 200 will move to the right (x−12y) pulling cylinder 190 the same distance.

Because piston 194 moves x−y, then it will move to the right relative to its housing 192 a distance=(x−y)−(x─ 12−y)=11y.

Distance L in secondary cylinder 220 will increase 11y*r

Secondary spring 130 will be compressed $(x-12y)+11y*r$
If $S''$=the rate of spring 130 in lb/inch, $$\text{Force}_{Spring130} = [(x-12y) + 11yr]S''$$
$$= \text{Force applied by secondary cylinder 220.}$$

The Force of each one of the cylinders 230, 180, 190, 200, and 210=$\{(x-12y)+11yr\}S''r$ $$\text{Force}_{Mass183} = [(x-12y)+11yr]S''+[(x-12y)+11yr]S''r \quad (a)$$

$$\text{Force}_{Mass126} = (x-y)S'+[(x-12y)+11yr]S''r \quad (b)$$

The force component $1.1y(R')$ is from the cylinder 150 and the piston 168.

From equation (a) and (b), and since the force on the frame 126 equals 10 times the force on the mass 138:

$$(x - y)300 + \{(x - 12y) + 11yr\}S''r + (1.1)y2000 = \quad (2)$$
$$10[\{(x - 12y) + 11yr\}S'' + \{(x - 12y) + 11yr\}S''r]$$

$$300x - 300y + xS''r - 12yS''r + 11yr^2S'' + 2200y =$$
$$10xS'' - 120yS'' - 10yrS'' + 10xS''r + 110yr^2S''$$

$$x(300 + S''r) + y(-300 - 12S''r + 11r^2S'' + 2200) =$$
$$x(10S'' + 10S''r) + y(-120S'' - 10rS'' + 110r^2S'')$$

From (2)

$$300+S''r=10S''+10S''r$$

$$S''=300/(10+9r) \quad (3)$$

And from (2)

$$-300-12S''r+11r^2S''+2200=-120S''-10rS''+110r^2S''$$

$$1900-2S''r-99r^2S''+120S=0 \quad (4)$$

From (3) and (4)

$$r=1.67 \quad **$$

$$S''=12 \text{ Lb/inch}$$

These values of r and $S''$ are for counterbalancing 100% of the force on the body 124. This will cause resilient member 128 to be squeezed or extended too much. To counterbalance 80% only, equation (1) will be:

$$300x - 300y + xS''r - 12yS''r + 11yr^2S'' + 2200y = \quad (5)$$
$$12.5[xS'' - 12yS'' + 11yrS'' + xS''r - 12S''r + 11yr^2S'']$$

$$x(300 + S''r) + y(-300 - 12r + 11r^2S'' + 2200) =$$
$$x(12.5xS'' + 12.5S''r) + y(-150S'' - 12.5rS'' + 137.5r^2S'')$$

From (5)

$$300+S''r=12.5S''+12.5S''r$$

$$S''=300/(21.5+11.5r) \quad (6)$$

and from (5)

$$-300-12S''r+11rS''+2200=-150S''-12.5rS''+137.5r^2S''$$

$$1900+0.5rS''-126.5rS''+150S''=0 \quad (7)$$

From (6) and (7)

$$r=2 \quad *$$

$$S''=8.45 \text{ Lb/inch} \quad *$$

(* to counterbalance 80% of the force on the body)

Figure 5:
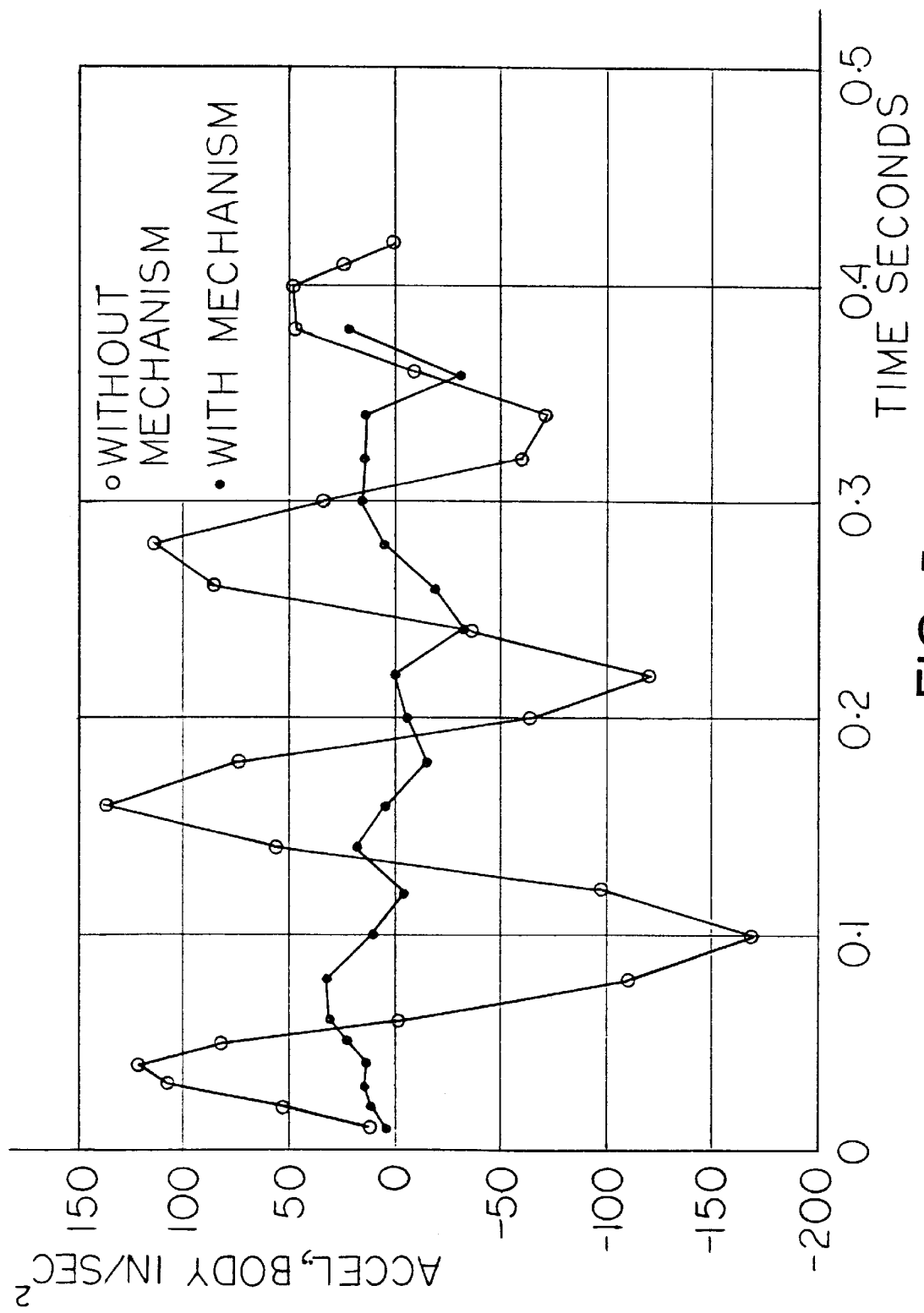
FIG. 5 is a graph of the acceleration of the vehicle body traveling over a two inch bump at 40 mph with and without the use of the present invention.

FIG. 5 illustrates graphically the difference in performance of a vehicle suspension both with and without the use of the present invention. Specifically, FIG. 5 illustrates the acceleration of the vehicle body 124 travelling over a 2 inch bump at 40 mph both with and without the present invention. The following tables and data illustrate the information used to compile the graph shown in FIG. 5.

TABLE III

| WITHOUT INVENTION |
| --- |
| A1 Distance traveled by wheel 120 (in.) |
| A2 Period of time of the interval (sec.) |
| A3 Distance compressed by primary resilient member 128 (in.) |
| A4 Force on body 124 at the end of previous interval (lb.) |
| A5 Velocity of body 124 at the end of previous interval (in./sec.) |
| A6 Distance traveled by body 124 at the end of previous interval (in.) |
| A7 Force on frame 126 at the end of previous interval (lb.) |
| A8 Velocity of frame 126 at the end of previous interval (in/sec.) |
| A9 Distance traveled by the frame 126 at the end of prev. interval (in.) |
| B1 Force on body 124 at the end of previous interval = 2000A3 |
| B2 Acceleration of body 124 = (B1 + A4)/1.553 |
| B3 Distance traveled by body 124 at the end of previous interval = .5(B2)(A2)² + A5 × A2 + A6 |
| B4 Distance traveled by frame 126 at the end of interval = B3 + A3 |
| B5 Force on frame 126 = 300(A1 − B3) − 2000A3 + (27 or −80) |
| B6 Acceleration of frame 124 = (B5 + A7)/3.106 |
| B7 Distance traveled by frame 126 at the end of interval 0.5(B6)(A2)² + (A8)(A2) + A9 change A3 until B7 = B4 |
| B8 Velocity of body 124 at the end of interval = (B2) × (A2) + A5 |
| B9 Velocity of frame 126 at the end of interval = (B6) × (A2) + A8 |

TABLE IV

| | WITH INVENTION | | | | | | |
| --- | --- | --- | --- | --- | --- | --- | --- |
| TIME, SEC | 0.01 | 0.02 | 0.03 | 0.05 | 0.06 | 0.08 | 0.01 |
| A1 | 2 | 0 | 0 | 0 | 0 | 0 | 0 |
| A2 | 0.01 | 0.01 | 0.01 | 0.01 | 0.01 | 0.02 | 0.02 |
| A3 | 0.0092 | 0.0324 | 0.04972 | 0.01816 | −0.019 | −0.067 | −0.06692 |

TABLE IV-continued

WITH INVENTION

| | | | | | | | |
|---|---|---|---|---|---|---|---|
| B1 | 18.4 | 64.8 | 99.44 | 36.32 | −38 | −134 | −133.84 |
| B2 | 11.84804 | 53.57373 | 105.7566 | 80.69543 | −1.08178 | −110.753 | −172.466 |
| B3 | 0.000592 | 0.004455 | 0.016285 | 0.072757 | 0.110024 | 0.1623 | 0.157932 |
| B4 | 0.009792 | 0.036855 | 0.066005 | 0.090917 | 0.091024 | 0.0953 | 0.091012 |
| B5 | 608.4223 | −146.137 | −184.326 | −138.147 | 31.99274 | 85.31013 | 86.46051 |
| B6 | 195.8861 | 148.8363 | −106.395 | −102.701 | −34.1772 | 37.76654 | 55.30285 |
| B7 | 0.009794 | 0.036822 | 0.066007 | 0.090911 | 0.091014 | 0.095354 | 0.102085 |
| B8 | 0.11848 | 0.654217 | 1.711783 | 3.73213 | 3.721312 | 1.506244 | −1.94308 |
| B9 | 1.958861 | 3.447224 | 2.383275 | 0.180587 | −0.16118 | 0.594151 | 1.106057 |

| | |
|---|---|
| A1 | Distance traveled by wheel 120 at the end of the interval (in.) |
| A2 | Period of the interval (sec.) |
| A3 | Distance compressed by primary resilient member 128 at the end of the interval (in.) |
| A4 | Velocity of frame 124 at the end of the previous interval (in./sec.) |
| A5 | Distance traveled by frame 124 at the end of the previous interval (in.) |
| A6 | Velocity of body 126 at the end of the previous interval (in./sec) |
| A7 | Distance traveled by body 126 at the end of the previous interval (in.) |
| A8 | Velocity of counterweight member 138 at end of the previous interval in./sec |
| A9 | Distance traveled by counterweight member 138 at the end of the previous interval inch |
| A10 | Force on frame 124 at the end of the previous interval (lb.) |
| A11 | Force on body 126 at the end of the previous interval (lb.) |
| A12 | Force on counterweight member 138 at the end of the previous interval |
| B1 | Force on frame 126 at the end of the interval (lb.) |
| B2 | Average acceleration of frame 126 during the interval (in./sec$^2$) |
| B3 | Distance traveled by frame 126 at the end of the interval (in.) |
| B4 | Distanced traveled by body 124 at the end of the interval (in.) |
| B5 | Average acceleration of body 124 during the interval (in./sec$^2$) |
| B6 | Total force on body 124 at the end of the interval (lb.) |
| B7 | Force on body 124 by mechanism at the end of the interval (lb.) |
| B8 | Distance compressed by secondary resilient member 140 at the end of the interval (in.) |
| B9 | Distance traveled by counterweight member 138 at the end of the interval (in.) |
| B10 | Force on counterweight member 138 at the end of the interval (lb.) |
| B11 | Average acceleration of counterweight member 138 during the interval (in./sec$^2$) |
| B12 | Distance traveled by counterweight member 138 at the end of the interval using the average acceleration of this interval and the velocity of the previous interval of counterweight member 138. Changing "A3" trial and error, until "B9" = "B12" will make all values matching and correct |
| B13 | Velocity of frame 126 at the end of the interval (in./sec.) |
| B14 | Velocity of body 124 at the end of the interval (in./sec.) |
| B15 | Velocity of counterweight member 138 at the end of the interval (in./sec.) |

| TIME, SEC | 0.01 | 0.02 | 0.03 | 0.04 | 0.06 | 0.08 | 0.1 |
|---|---|---|---|---|---|---|---|
| A1 | 2 | 0 | 0 | 0 | 0 | 0 | 0 |
| A2 | 0.01 | 0.01 | 0.01 | 0.01 | 0.01 | 0.0015 | 0.02 |
| A3 | 0.010401 | 0.039473 | 0.07317 | 0.099411 | 0.12571 | 0.114505 | 0.0844 |
| B1 | 655.511 | −95.6616 | −92.8973 | −96.638 | −120.515 | −82.4149 | 1.124499 |
| B2 | 211.0467 | 180.2477 | −60.708 | −61.0223 | −75.574 | −61.8 | −26.4313 |
| B3 | 0.010612 | 0.040738 | 0.076849 | 0.106889 | 0.14684 | 0.158627 | 0.152615 |
| B4 | 0.000211 | 0.001266 | 0.003679 | 0.007478 | 0.02113 | 0.044122 | 0.068215 |
| B5 | 4.212322 | 12.67213 | 14.48712 | 13.24051 | 29.68182 | 9.392731 | −5.26749 |
| B6 | 6.540894 | 13.13638 | 9.359223 | 11.20063 | 23.692 | −10.5149 | 2.335548 |
| B7 | −14.2611 | −65.8086 | −136.981 | −187.621 | −227.728 | −239.525 | −166.464 |
| B8 | 0.007131 | 0.032904 | 0.06849 | 0.093811 | 0.113864 | 0.119762 | 0.083232 |
| B9 | 0.121752 | 0.468368 | 0.887039 | 1.19481 | 1.517804 | 1.423439 | 1.079847 |
| B10 | 62.92265 | −9.38857 | −12.0007 | −13.65 | −14.6135 | −6.73911 | −4.3164 |
| B11 | 2431.331 | 2068.557 | −826.481 | −991.143 | −1103.76 | −826.525 | −427.185 |
| B12 | 0.121567 | 0.468313 | 0.877033 | 1.194823 | 1.517367 | 1.423571 | 1.079358 |
| B13 | 2.110467 | 3.912944 | 3.395864 | 2.695641 | 1.261033 | −0.0363 | −0.56493 |
| B14 | 0.042123 | 0.168844 | 0.313715 | 0.44612 | 0.959312 | 1.257312 | 1.151962 |
| B15 | 24.31331 | 44.99888 | 36.73407 | 26.82264 | 5.119672 | −12.9322 | −21.4759 |

FIG. 7 shows a standard vehicle suspension on which the first or second embodiments of the present invention can be utilized. The primary spring 116 is mounted on a lower control arm 121 of the wheel assembly 120, and the resilient member 128 is disposed between the vehicle frame 126 and vehicle body 124. For illustration, the hydraulic cylinder 160 is disclosed between the vehicle frame 126 and body 124, while additional components of the present invention are not shown.

Figure 3A:
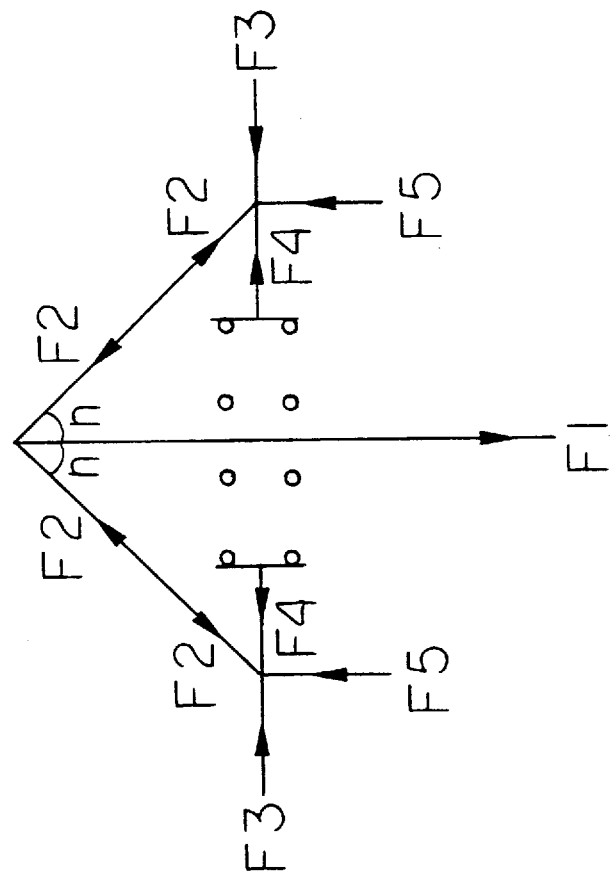
FIG. 3a is a free body diagram of the forces acting on the frictional shock absorber shown in FIG. 3.
Figure 3:
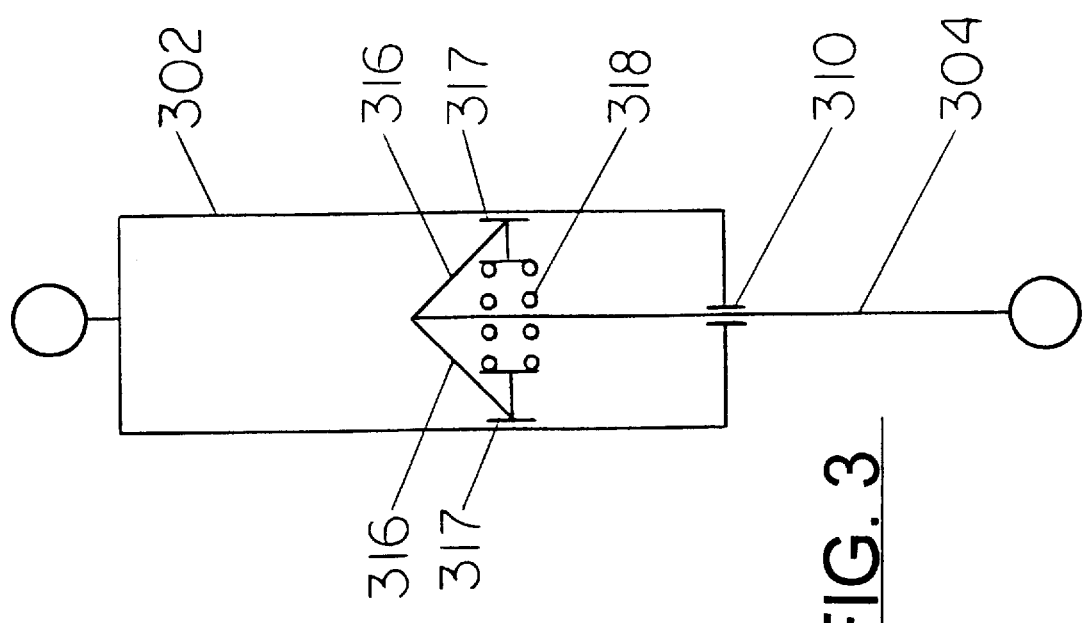
FIG. 3 is a sectional view of a frictional shock absorber.

Frictional dampers of the kind generally shown at 300 in FIG. 3 are used in the preferred embodiment of the present invention, although other dampers may be used. The frictional damper 300 includes a square housing 302 and a rod 304. The square housing 302 has a first end 306 which provides an attaching point and a second end 308 which has a sealed passage 310 that receives the rod 304. The rod 304 has a first end 312 and a second end 314. Links 316 are pivotally attached to the second end 314 of the rod 304. A spring or springs 318 are disposed between friction plates 317 transverse to the axis of the rod 304.

FIG. 4 illustrates a free body diagram of the forces acting upon the frictional damper 300 of FIG. 3. The following equations illustrate the operation of the frictional damper 300.

$$F1=2F2 \cos n$$

$$F2=F1/(2 \cos n) \tag{1}$$

$$F2 \sin n + F4 = F3 \tag{2}$$

$$F5=cF3 \tag{3}$$

c=the coefficient of friction between the friction pad and the cylinder.

From (1), (2), and (3)

$$F1 \sin n/(2\cos n) + F4 = F5/c \quad\quad F1=2F5$$

$$F1 \tan n/2 + F4 = F1/2c$$

$$F1 = 2cF4/(1-c \tan n) \quad\quad **$$

This equation shows the relation between F1, F4 and n during extension of the damper 300.

Following similar steps $$F1 = 2cF4/(1+c \tan n) \quad\quad **$$

This equation shows the same as the previous equation during contraction of the damper 300.

For example: If angle n=60, force of spring 318=30 lb and if the coefficient of friction c between friction pad 316 and housing 302 =0.4, $$F1(\text{extension}) = 2cF4/(1 - c \tan n)$$
$$= 2x \cdot 4x30/(1 - c \tan 60) = 78 \text{ lb}$$

$$F1(\text{contraction}) = 2x \cdot 4x30/(1 + c \tan a60) = 14 \text{ lb}$$

To overcome unnecessarily high spring rates when vehicle loads are light, the preferred embodiment incorporates a two-stage spring system shown at 400 in FIG. 4. The spring system includes a first, light spring 402 having a first end 404 and a second end 406 coaxial with a second, heavy spring 408 having a first end 410 and a second end 412. The first spring 402 is longer than second spring 408. The first spring 402 is disposed between the wheel assembly 420 and the frame 426. The first end 410 the heavy spring is attached to the wheel assembly 420. As the wheel assembly 420 travels up and down under light vehicle loads, for example with only one passenger, only the first spring 402 will be compressed and expanded. However, under heavier vehicle loads for which a higher spring rate is needed, such as with four passengers, the first spring 402 will be compressed until the relative distance between the frame and wheel assembly is less than the length of the second spring 408, at which time the second spring 408 will also be compressed. The two-staged spring system 400 can be incorporated in the present invention in the place of springs 116,130.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An assembly for counterbalancing substantially all of a force applied to a vehicle body which is created by contact between an uneven road surface and a vehicle wheel assembly, by transmitting the force to a force between the body and a vehicle frame or subframe, said assembly comprising:

a first resilient member disposed between the vehicle frame and the vehicle body;

a primary resilient suspension system including a first end supported by the vehicle frame and a second end supported by the vehicle wheel assembly;

a counterbalancing apparatus including a counterweight member, a second resilient member, and a secondary resilient suspension system;

a first hydraulic cylinder operatively joined to the vehicle frame and the vehicle body;

a second hydraulic cylinder operatively joined to the vehicle frame and said counterbalancing apparatus;

a first fluid conduit connecting said first and second hydraulic cylinders in fluid communication;

a third hydraulic cylinder operatively joined to the wheel assembly and to the vehicle frame;

a fourth hydraulic cylinder operatively joined to the wheel assembly and to said counterbalancing apparatus; and a second fluid conduit connecting said third and fourth hydraulic cylinders in fluid communication.

2. An assembly as set forth in claim 1 wherein:

said first hydraulic cylinder includes a first diameter;

said second hydraulic cylinder includes a second diameter said counterweight member includes a mass proportional to a mass of the vehicle;

said first resilient member includes a rate proportional to a rate of said second resilient member by a ratio equal to the ratio of the square of said first diameter to the square of said second diameter;

said primary suspension system and said secondary suspension system each include a spring; and said spring in said primary suspension system includes a rate proportional to said spring in said secondary suspension system.

3. An assembly as set forth in claim 2 wherein:

said second fluid conduit includes a fifth hydraulic cylinder supported by the vehicle frame, a sixth hydraulic cylinder, a seventh hydraulic cylinder supported by the vehicle frame, and a compensating hydraulic cylinder operatively joining the wheel assembly and said counterweight member;

said fifth hydraulic cylinder is in fluid communication with said third hydraulic cylinder;

a mechanical linkage operatively joins said fifth hydraulic cylinder with said sixth hydraulic cylinder; and said seventh hydraulic cylinder is in fluid communication with said eighth hydraulic cylinder.

4. An assembly as set forth in claim 1 wherein:

said third hydraulic cylinder includes a diameter larger than a diameter of said fourth hydraulic cylinder.

* * * * *